United States Patent
Araki et al.

(10) Patent No.: US 6,177,503 B1
(45) Date of Patent: Jan. 23, 2001

(54) RUBBER COMPOSITION AND PNEUMATIC TIRE USING THE SAME RUBBER COMPOSITION

(75) Inventors: Shunji Araki; Kazuhiro Yanagisawa, both of Tokyo (JP)

(73) Assignee: Bridgestone Corporation, Tokyo (JP)

( * ) Notice: Under 35 U.S.C. 154(b), the term of this patent shall be extended for 0 days.

(21) Appl. No.: 09/217,566

(22) Filed: Dec. 21, 1998

(30) Foreign Application Priority Data

Dec. 22, 1997 (JP) .................................................. 9-353170

(51) Int. Cl.⁷ ........................................................ C08K 3/36
(52) U.S. Cl. ..................... 524/492; 524/571; 524/575.5; 524/262; 525/342; 525/343; 152/450
(58) Field of Search ................. 524/571, 575.5, 524/342, 492, 262; 152/450

(56) References Cited

U.S. PATENT DOCUMENTS

| | | | | |
|---|---|---|---|---|
| 3,873,489 | * | 3/1975 | Thurn et al. ........................... | 524/262 |
| 5,227,425 | * | 7/1993 | Rauline ................................. | 524/493 |

FOREIGN PATENT DOCUMENTS

| | | |
|---|---|---|
| 0 680 997 A1 | 11/1995 | (EP) . |
| 0 819 694 A2 | 1/1998 | (EP) . |
| 0 819 694 A3 | 1/1998 | (EP) . |
| 0 881 256 A2 | 12/1998 | (EP) . |
| 62-10530 | 5/1982 | (JP) . |
| 7-228588 | 8/1995 | (JP) . |
| 8-259739 | 10/1996 | (JP) . |
| 8-333482 | 12/1996 | (JP) . |
| 8-337687 | 12/1996 | (JP) . |
| 9-3245 | 1/1997 | (JP) . |
| WO97/40095 | 10/1997 | (WO) . |
| WO97/40096 | 10/1997 | (WO) . |

* cited by examiner

*Primary Examiner*—Robert Dawson
*Assistant Examiner*—Kwo-Liang Peng
(74) *Attorney, Agent, or Firm*—Sughrue, Mion, Zinn, Macpeak & Seas, PLLC

(57) ABSTRACT

The rubber composition of the present invention comprises a rubber component which is a blend rubber of a copolymer rubber and other diene based rubbers or the copolymer rubber alone, the copolymer rubber having a glass transition temperature of −60° C. or higher, a styrene content of 15 to 30% by weight and a vinyl content of 40 to 70% of a butadiene portion and the blend rubber comprising 55 parts by weight or more of the copolymer rubber and 45 parts by weight or less of the other diene based rubbers in 100 parts by weight of the rubber component; 20 to 100 parts by weight of silica per 100 parts by weight of the rubber component; 0 to 100 parts by weight of carbon black per 100 parts by weight of the rubber component, a ratio by weight of the amount of the silica to the amount of the carbon black being 1:1 to 1:0; and, in an amount of 1 to 20% by weight of the amount of silica, a specific silane coupling agent which is a bis(alkoxysilylalkyl) polysulfide having a specific polysulfide structure with a specific distribution of sulfur. The obtained rubber composition has excellent workability. The pneumatic tire using this rubber composition shows improved uniformity and abrasion resistance.

18 Claims, No Drawings

RUBBER COMPOSITION AND PNEUMATIC TIRE USING THE SAME RUBBER COMPOSITION

BACKGROUND OF THE INVENTION

1. Field of the Invention

The present invention relates to a rubber composition and to a pneumatic tire using said rubber composition, and more particularly, to a rubber composition showing improved workability due to suppressing an increase with time in Mooney viscosity of a mixed rubber and improving shrinkage of the mixed rubber, and to a pneumatic tire using said rubber composition and having excellent uniformity and abrasion resistance.

2. Description of the Related Art

Recently, because of social requirements to save energy and to save resources, and particularly to cut down fuel consumption of automobiles, much research has been carried out with respect to decreasing the rolling resistance of tires and many proposals have been made.

To further improve the low heat buildup property and the low rolling resistance of a rubber composition or a tire using the same, silica is generally used in the rubber composition and a silane coupling agent such as Si69 is also used in combination.

However, a rubber composition containing silica shows very large shrinkage, causing inferior workability. Generally in a process for producing a tire, an unvulcanized rubber composition is extruded to form a prescribed shape and the extruded composition is cut to lengths prescribed for various rubber parts of the tire in accordance with the tire size. However, a rubber composition containing silica shows large shrinkage causing changes in the length after being cut and workability in tire building deteriorates to a great degree. The shrinkage is larger in portions in the vicinity of the cut surfaces of the rubber parts. As the result, the rubber parts around joint portions have larger weights and this causes a decrease in the uniformity of the tire. A rubber composition containing silica has another drawback in that the abrasion resistance thereof is inferior.

A rubber composition containing silica and Si69 shows a large increase in Mooney viscosity with time after being prepared by mixing, and workability in the extrusion step is inferior.

As for the rubber composition containing silica and a silane coupling agent, it is disclosed in International Patent Application Laid-Open No. WO97/40095 that a rubber composition comprising a conventional rubber component, silica, a specific silane coupling agent and various types of silica dispersion improvers can suppress formation of blisters during extrusion at high temperatures, prevent formation of gel, improve dispersion of silica without decreasing workability and provide a tire having excellent abrasion resistance, low heat buildup property and low rolling resistance. However, it is desired that an increase with time in Mooney viscosity of a mixed rubber composition be suppressed and shrinkage be decreased, to improve the workability and uniformity of a tire. It is disclosed in International Patent Application Laid-Open No. WO97/40096 that a rubber composition comprising a conventional rubber component and a specific silane coupling agent shows an effect similar to that shown in International Patent Application Laid-Open No. WO97/40095. However, the same drawback as that described above remains. Similar rubber compositions are disclosed in Japanese Patent Application Laid-Open (hereinafter, referred to as JP-A) Nos. 9-3245, 8-337687 and 8-333482. However, improvement in the workability and uniformity of a tire by suppressing an increase with time in Mooney viscosity of a rubber composition and by improving shrinkage is not sufficiently disclosed, not disclosed at all or not even suggested.

SUMMARY OF THE INVENTION

In view of the above circumstances, an object of the present invention is to provide a rubber composition which shows improved workability due to suppressing an increase with time in Mooney viscosity of a mixed rubber and improving the shrinkage of the mixed rubber and which improves the uniformity and the abrasion resistance of a tire and to provide a pneumatic tire using this rubber composition.

As the result of extensive studies by the present inventors with attention particularly paid to the rubber component and compounding ingredients, it was found that the above object can be achieved by the following means. The present invention has been completed on the basis of this knowledge.

Accordingly, (1) the rubber composition of the present invention comprises:

a rubber component which is a blend rubber of a copolymer rubber and other diene based rubbers or the copolymer rubber alone, the copolymer rubber being obtained by copolymerization of 1,3-butadiene and styrene using an organolithium compound as an initiator, the copolymer rubber having a glass transition temperature of −60° C. or higher, a styrene content of 15 to 30% by weight and a vinyl content of 40 to 70% of a butadiene portion and the blend rubber comprising 55 parts by weight or more of the copolymer rubber and 45 parts by weight or less of the other diene based rubbers in 100 parts by weight of the rubber component;

20 to 100 parts by weight of silica per 100 parts by weight of the rubber component;

0 to 100 parts by weight of carbon black per 100 parts by weight of the rubber component, a ratio by weight of the amount of silica to the amount of carbon black being 1:1 to 1:0; and in an amount of 1 to 20% by weight of the amount of silica, a silane coupling agent represented by following general formula (1):

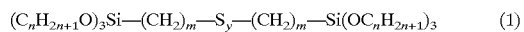

(wherein n represents an integer of 1 to 3, m represents an integer of 1 to 9, y represents a positive number of 1 or more and has a distribution), and in which the content of trisulfide silane component, where y is 3, is 25% or more based on the entire amount of the silane coupling agent, and the content of high polysulfide components, where y is 5 or a number greater than 5, is 50% or less based on the entire amount of the silane coupling agent.

(2) In (1) described above, it is preferable that the amount of the silane coupling agents is 2 to 15% by weight based on the amount by weight of silica.

(3) In (1) described above, it is preferable that the content of the trisulfide silane component, where y is 3, in the sulfide silane coupling agent molecule represented by general formula (1) is 30% or more based on the entire amount of the silane coupling agent, and the content of the high polysulfide silane components, where y represents 5 or a number greater than 5, is 40% or less based on the entire amount of the silane coupling agent.

(4) In (1) described above, it is preferable that the copolymer rubber has been treated by coupling at ends of the copolymer chains with one coupling agent selected from the group consisting of coupling agents containing tin, coupling agents containing silicon and coupling agents containing alkoxysilanes.

(5) In (1) described above, it is preferable that the other diene based rubber is at least one rubber selected from the group consisting of natural rubber, polybutadiene rubber, polyisoprene rubber and styrene-butadiene copolymer rubbers produced by emulsion polymerization.

(6) In (1) described above, it is preferable that the silica has colloidal properties which are a nitrogen adsorption specific surface area of 100 m$^2$/g or more and less than 300 m$^2$/g and a dibutyl phthalate oil absorption of 100 ml/100 g or more and less than 400 ml/100 g.

(7) In (1) described above, it is preferable that the rubber composition comprising the rubber component, the silica, the carbon black and the coupling agents is treated by mixing at temperatures having a maximum at 150° C. to 180° C.

(8) In (1) described above, it is preferable that the rubber composition shows an increase in Mooney viscosity of 2 to 15% after being left standing at a room temperature for 48 hours before being vulcanized.

(9) In (1) described above, it is preferable that the carbon black is an electrically conductive carbon black.

(10) The pneumatic tire of the present invention has a rubber composition disposed at least in a portion of a tread that is in contact with a road surface, wherein the rubber composition comprises:

a rubber component which is a blend rubber of a copolymer rubber and other diene based rubbers or the copolymer rubber alone, the copolymer rubber being obtained by copolymerization of 1,3-butadiene and styrene using an organolithium compound as an initiator, the copolymer rubber having a glass transition temperature of —60° C. or higher, a styrene content of 15 to 30% by weight and a vinyl content of 40 to 70% of a butadiene portion and the blend rubber comprising 55 parts by weight or more of the copolymer rubber and 45 parts by weight or less of the other diene based rubbers in 100 parts by weight of the rubber component;

20 to 100 parts by weight of silica per 100 parts by weight of the rubber component;

0 to 100 parts by weight of carbon black per 100 parts by weight of the rubber component, a ratio by weight of the amount of silica to the amount of carbon black being 1:1 to 1:0; and in an amount of 1 to 20% by weight of the amount of silica, a silane coupling agent represented by following general formula (1):

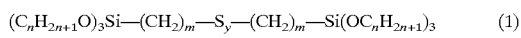

$(C_nH_{2n+1}O)_3Si—(CH_2)_m—S_y—(CH_2)_m—Si(OC_nH_{2n+1})_3$ (1)

(wherein n represents an integer of 1 to 3, m represents an integer of 1 to 9, y represents a positive number of 1 or more and has a distribution), and in which the content of trisulfide silane component, where y is 3, is 25% or more based on the entire amount of the silane coupling agent, and the content of high polysulfide components, where y is 5 or a number greater than 5, is 50% or less based on the entire amount of the silane coupling agent.

(11) In (10) described above, it is preferable that the amount of the silane coupling agents is 2 to 15% by weight based on the amount by weight of silica.

(12) In (10) described above, it is preferable that the content of the trisulfide silane component, where y is 3, in the sulfide silane coupling agent molecule represented by general formula (1) is 30% or more based on the entire amount of the silane coupling agent, and the content of the high polysulfide silane components, where y represents 5 or a number greater than 5, is 40% or less based on the entire amount of the silane coupling agent.

(13) In (10) described above, it is preferable that the copolymer rubber has been treated by coupling at ends of the copolymer chains with one coupling agent selected from the group consisting of coupling agents containing tin, coupling agents containing silicon and coupling agents containing alkoxysilanes.

(14) In (10) described above, it is preferable that the other diene based rubber is at least one rubber selected from the group consisting of natural rubber, polybutadiene rubber, polyisoprene rubber and styrenebutadiene copolymer rubbers produced by emulsion polymerization.

(15) In (10) described above, it is preferable that the silica has colloidal properties which are a nitrogen adsorption specific surface area of 100 m$^2$/g or more and less than 300 m$^2$/g and a dibutyl phthalate oil absorption of 100 ml/100 g or more and less than 400 ml/100 g.

(16) In (10) described above, it is preferable that the rubber composition comprising the rubber component, the silica, the carbon black and the coupling agents is treated by mixing at temperatures having a maximum at 150° C. to 180° C.

(17) In (10) described above, it is preferable that the rubber composition shows an increase in Mooney viscosity of 2 to 15% after being left standing at a room temperature for 48 hours before being vulcanized.

(18) In (10) described above, it is preferable that the carbon black is an electrically conductive carbon black.

DESCRIPTION OF THE PREFERRED EMBODIMENTS

A copolymer used in the present invention is obtained by copolymerization of 1,3-butadiene and styrene using an organolithium compound as an initiator and can be produced in accordance with a known production process. An inert organic solvent such as pentane, hexane, cyclohexane, hexane, heptane, benzene, xylene, toluene, tetrahydrofuran and diethyl ether is used for the production.

In the present invention, aromatic vinyl monomers such as α-methylstyrene, 1-vinylnaphthalene, 3-vinyltoluene, ethylvinylbenzene, divinylbenzene, 4-cyclohexylstyrene and 2,4,6-trimethylstyrene may be used in place of styrene.

Examples of the organolithium compound used for copolymerization of 1,3-butadiene and styrene include alkyllithiums such as n-butyllithium, sec-butyllithium, t-butyllithium and reaction products of butyllithium and divinylbenzene; alkylenedilithiums such as 1,4-dilithiumbutane; phenyllithium; stilbenedilithium; diisopropenylbenzenedilithium and lithiumnaphthalene. In the copolymerization, a Lewis base may be used, where necessary, as a randomizer and as a modifier for a microstructure of butadiene units in a copolymer. Specific examples of the Lewis base include ethers and tertiary amines such as dimethoxybenzene, tetrahydrofuran, dimethoxyethane, diethylene glycol dibutyl ether, diethylene glycol dimethyl ether, triethylamine, pyridine, N-methylmorpholine and N,N,N',N'-tetramethylethylenediamine.

In a polymerization process for producing a living polymer, the polymerization system is purged with nitrogen and an inert organic solvent, the monomers, i.e., 1,3-butadiene and styrene, an organolithium compound and, optionally, a Lewis base are placed into a reactor simultaneously in the entire amounts, intermittently in separate portions or continuously in portions to conduct the polymerization.

The polymerization temperature is generally −120° C. to +150° C. and preferably −80° C. to +120° C. The polymerization time is generally 5 minutes to 24 hours and preferably 10 minutes to 10 hours.

Polymerization may be conducted within the above temperature range at a fixed temperature, at an increasing temperature or under an adiabatic condition. A polymerization reaction may be conducted batchwise or continuously.

The concentration of the monomers in the reaction solution is generally 5 to 50% by weight and preferably 10 to 35% by weight.

To produce a living polymer without inactivation of the organolithium compound and the living polymer, it is necessary that much care be taken to prevent contamination of the polymerization system with inactivating compounds such as halogen compounds, oxygen, water and carbon dioxide gas.

It is necessary that the glass transition temperature of the copolymer used in the present invention be −60° C. or higher. When the glass transition temperature is lower than −60° C., shrinkage of the unvulcanized rubber composition increases. It is also necessary that the content of bound styrene in the copolymer obtained by copolymerization of 1,3-butadiene and styrene be 15 to 30% by weight. When the content is less than 15% by weight, shrinkage of the unvulcanized rubber composition increases. When the content exceeds 30% by weight, the abrasion resistance of the tire decreases. Therefore, such contents are not preferable.

The vinyl content in the butadiene portion of the copolymer in the present invention is 40 to 70% and preferably 45 to 65%. When the vinyl content is less than 40%, shrinkage of the unvulcanized rubber composition increases. When the vinyl content exceeds 70%, strength at break of the vulcanized rubber composition decreases and the abrasion resistance of a tire deteriorates. Therefore, such contents are not preferable.

The rubber component used in the present invention comprises the above copolymer alone or is a blend rubber comprising 55 parts by weight or more of the above styrene-butadiene copolymer rubber and 45 parts by weight or less of other diene based rubbers in 100 parts by weight of the rubber component. When the amount of the copolymer in the above blend rubber is less than 55 parts by weight, i.e., when the amount of the other diene based rubbers exceeds 45 parts by weight, shrinkage of the unvulcanized rubber increases and the amount is not preferable.

As the other diene based rubber used in the present invention, at least one rubber selected from the group consisting of natural rubber, polybutadiene rubber, polyisoprene rubber and styrene-butadiene copolymer rubbers produced by emulsion polymerization is advantageously used. Natural rubber and polybutadiene rubber are more preferable among these rubbers.

As the copolymer used in the present invention, a copolymer which has been treated by coupling at chain ends with a coupling agent containing tin, a coupling agent containing silicon or a coupling agent containing an alkoxysilane is preferable. In other words, a coupled copolymer can be obtained by treating active lithium at chain ends of a copolymer with a coupling agent containing tin, a coupling agent containing silicon or a coupling agent containing an alkoxysilane, and coupling the chains of the copolymer. Examples of the coupling agent containing tin include tin halogen compounds, examples of which include tin halides such as tin tetrachloride and organotin halides such as dibutyldichlorotin, diphenyldichlorotin and triphenyltin chloride. Examples of the coupling agent containing silicon include silicon halogen compounds such as silicon tetrachloride and trichlorotriethylenesilane. The tin halogen compounds and the silicon halogen compounds are used in such an amount that the number of the lithium atoms at the active end of the copolymer is equivalent to the number of the halogen atoms in the coupling agent.

The coupling agent containing an alkoxysilane is a silane compound containing at least one alkoxy group in one molecule and is represented by the following general formula (2):

$$X_P Si(OR)_T R'_{4-P-T} \tag{2}$$

wherein X represents a halogen atom which is chlorine atom, bromine atom or iodine atom, R and R' each independently represents an alkyl group, an aryl group or a halogenated aryl group having 1 to 20 carbon atoms, T represents an integer of 1 to 4, P represents an integer of 0 to 2 and the sum of P and T is 2 to 4.

As the above silane compound, compounds having an OR group which is not hydrolyzed, i.e., an alkoxy group, an aryloxy group or a cycloalkoxy group which has 4 to 20 carbon atoms and is not hydrolyzed are preferable. It is particularly preferable that R in the OR group represents a hydrocarbon group having three carbon atoms bonded to the α-carbon, a hydrocarbon group having one or more hydrocarbon group bonded to the β-carbon or an aromatic hydrocarbon group such as phenyl group and toluyl group.

Examples of the alkyl group represented by R' include methyl group, ethyl group, n-propyl group and t-butyl group. Examples of the aryl group represented by R' include phenyl group, toluyl group and naphthyl group. Examples of the halogenated alkyl group represented by R' include chloromethyl group, bromomethyl group, iodomethyl group and chloroethyl group.

Examples of the compound represented by general formula (2) include dialkyldialkoxysilanes when P represents 0 and T represents 2, monoalkyltrialkoxysilanes when P represents 0 and T represents 3, tetraalkoxysilanes when P represents 0 and T represents 4, monohalogenated dialkylmonoalkoxysilanes when P represents 1 and T represents 1, monohalogenated monoalkyldialkoxysilanes when P represents 1 and T represents 2, monohalogenated trialkoxysilanes when P represents 1 and T represents 3, dihalogenated monoalkylmonoalkoxysilanes when P represents 2 and T represents 1 and dihalogenated dialkoxysilanes when P represents 2 and T represents 2. All these compounds are reactive with the active end of the living polymer.

Monoalkyltriaryloxysilanes obtained when P represents 0 and T represents 3 and tetraaryloxysilanes obtained when P represents 0 and T represents 4 are particularly preferable in order to improve processability by coupling of living polymers and to provide polymers with a functional group having a large affinity with silica.

As the silica used in the present invention, synthetic silica produced by the precipitation process is used. Examples of such silica include NIPSIL AQ manufactured by NIPPON SILICA INDUSTRIAL Co., Ltd.; ULTRASIL VN3 and BV 3370GR manufactured by DEGUSSA AG., a German company; ZEOSIL 1165MP, ZEOSIL 165GR and ZEOSIL 175MP manufactured by RÔHNE-POULENC Company and HISIL 233, HISIL 210 and HISIL 255 manufactured by PPG Company (all trade names). However, the silica used in the present invention is not limited to the above examples. The silica is used in an amount of 20 to 100 parts by weight and preferably 30 to 80 parts by weight per 100 parts by weight of the rubber component. When the amount of the silica is less than 20 parts by weight, the wet skid resistance of the tire decreases and such an amount is not preferable.

In combination with the silica, carbon black is used as a filler in an amount of 0 to 100 parts by weight and preferably 20 to 60 parts by weight per 100 parts by weight of the rubber component. To provide the rubber composition with electric conductivity, it is preferable that an electrically conductive carbon black such as ketjen black, fibrous black and a carbon black manufactured by a gas phase process is used.

It is necessary that the ratio by weight of the amount of the silica to the amount of carbon black is 1:1 to 1:0. When the ratio by weight is less than 1: 1, i.e., when the content of the silica in the filler is less than 50% by weight, the low heat buildup property becomes inferior and the low rolling resistance of the tire deteriorates. Therefore, such a ratio is not preferable.

As for the colloidal properties of the silica, it is preferable that nitrogen adsorption surface area (N2SA) is 100 $m^2/g$ or more and less than 300 $m^2/g$, dibutyl phthalate oil absorption (DBP) is 100 ml/100 g or more and less than 400 ml/100 g and preferably 100 ml/100 g or more and 350 ml/100 g or less. Dibutyl phthalate oil absorption and nitrogen adsorption surface area can be obtained in accordance with methods of ASTM D2414-93 and ASTM D4820, respectively.

The silane coupling agent used in the present invention is a silane coupling agent represented by following general formula (1):

$$(C_nH_{2n+1}O)_3Si-(CH_2)_m-S_y-(CH_2)_m-Si(OC_nH_{2n+1})_3 \quad (1)$$

In the above formula, it is required that n represents an integer of 1 to 3, m represents an integer of 1 to 9, y represents a positive number of 1 or more and has a distribution, the content of trisulfide silane component, where y is 3, is 25% or more and preferably 30% or more based on the entire amount of the silane coupling agent, and the content of high polysulfide components, where y is 5 or a number greater than 5, is 50% or less and preferably 40% or less based on the entire amount of the silane coupling agent. By using the silane coupling agents, formation of gel during mixing at a high temperature of 150° C. or more can be suppressed and a decrease in productivity caused by a large increase in Mooney viscosity can be prevented.

The amount of the mixture of the silane coupling agents is 1 to 20% by weight and preferably 2 to 15% by weight based on the amount by weight of silica. When the amount is less than 1% by weight, the coupling effect is small. When the amount exceeds 20% by weight, formation of gel in the polymer occurs. Therefore, such amounts are not preferable.

It is preferable that the rubber composition of the present invention shows an increase in Mooney viscosity of 2 to 15% after being left standing at a room temperature for 48 hours before being vulcanized.

To effectively exhibit the advantageous properties of the rubber composition of the present invention, it is preferable that the rubber composition comprising the rubber component, silica, carbon black and silane coupling agents are mixed (kneaded) at a temperature of 150 to 180°. When the temperature during mixing is lower than 150° C., the coupling agents do not react sufficiently and blisters are formed during extrusion. When the temperature is higher than 180° C, formation of gel in the polymer occurs and Mooney viscosity increases. Therefore, such an amount is not preferable in view of processability.

The rubber composition of the present invention may comprise other conventional compounding ingredients such as antioxidants, zinc oxide, stearic acid and softeners.

EXAMPLES

The present invention is described more specifically with reference to the following examples.

Various rubber compositions were prepared in accordance with the formulations shown in Tables 3 and 4. The silane coupling agents used in the formulations are represented by the following formula:

$$(C_2H_5O)_3Si-(CH_2)_{3-S_y}-(CH_2)_3-Si(OC_2H_5)_3$$

The distribution of $S_y$ in the above formula is shown in Table 1. The distribution of various sulfur chain components ($-S_y-$) shown in Table 1 was calculated from peak areas (%) obtained with high performance liquid chromatography (HPLC). The analysis with HPLC is described in detail in the following.

(Conditions of analysis by HPLC)

HPLC: manufactured by TOSOH CORPORATION; HLC-8020

UV detector: manufactured by TOSOH CORPORATION; UV-8010 (254 nm)

Recorder: manufactured by TOSOH CORPORATION; SUPER SYSTEM CONTROLLER SC-8010

Column: manufactured by TOSOH CORPORATION; TSK GEL ODS-80T$_M$ CTR (diameter: 4.6 mm, length: 10 cm)

Temperature at the time of measurement: 25° C.

Concentration of sample: 6 mg/10 cc acetonitrile solution

Amount of sample injected: 20 μl

Condition of elution: a flow rate of 1 cc/min

Elution was conducted for 2 minutes with a mixed solution of acetonitrile and water having a fixed composition of 1:1 and then was conducted with such a gradient that the solution contained 100% of acetonitrile after 18 minutes.

TABLE 1

|  | $-S_2-$ | $-S_3-$ | $-S_4-$ | $-S_5-$ | $-S_6-$ | $-S_7-$ | $-S_8-$ | $-S_9-$ | $-S_5-$ or more |
|---|---|---|---|---|---|---|---|---|---|
| Sample A | 17.64 | 44.14 | 23.40 | 8.49 | 1.92 | 1.06 | 3.37 | 0 | 14.83 |
| Sample B | 7.16 | 30.33 | 29.38 | 18.29 | 8.24 | 3.28 | 0.96 | 2.36 | 33.13 |
| Sample C | 2.53 | 15.85 | 23.77 | 24.27 | 18.33 | 10.24 | 3.83 | 1.18 | 57.85 |
| Sample D | 97.3 | 2.7 | 0 | 0 | 0 | 0 | 0 | 0 | 0 |

Samples A to D shown in Table 1 were obtained as follows:

Samples A and B

Samples A and B were synthesized in accordance with a process described in JP-A No. 7-228588 from anhydrous sodium sulfate and sulfur in the following ratios by mol:

Sample A 1:1.5
Sample B 1:2

Sample C

Si69 manufactured by DEGUSSA AG., a German company

Sample D

Sample D was synthesized in accordance with a process described in JP-A No. 8-259739.

The structure and the physical property of solution polymerized SBR used as the rubber component are shown in Table 2. The two types of solution polymerized SBR shown in Table 2 were synthesized in accordance with a process described in Japanese Patent Application Publication 62-10530 by coupling with tin tetrachloride.

TABLE 2

| | solution polymerized SBR | |
|---|---|---|
| | I | II |
| Styrene content (% by weight) | 20 | 30 |
| Vinyl content (%) | 60 | 40 |
| Glass transition temperature Tg (° C.) | −42 | −44 |

Using the coupling agents and the copolymers obtained above, nine rubber compositions were prepared by mixing components in accordance with the formulations shown in Table 3 and 4. Unvulcanized treads were prepared by extrusion of the obtained rubber compositions. Using the prepared unvulcanized treads, nine pneumatic radial tires of size 185/65-14 were prepared. The glass transition temperature of the copolymers was evaluated in accordance with a following method.

The shrinkage and the increase in Mooney viscosity of the obtained rubber compositions were evaluated in accordance with a method also described bellow. The uniformity and the abrasion resistance of the prepared tires were evaluated in accordance with a method also described bellow.

(1) Glass Transition Temperature (Tg)

Measurement in accordance with the differential scanning calorimetry was conducted using DSC200 manufactured by SEIKO DENSHI Co., Ltd. while the temperature was raised at the rate of 10° C./minute, and the glass transition temperature was obtained from the endothermic peak.

(2) Shrinkage of Unvulcanized Rubber

Lengths of extruded unvulcanized treads for a pneumatic tire of size 185/65-14 having the same weight were compared. The result was expressed as an index using the result obtained in Comparative Example 1 as a reference set to 100. The smaller the numerical value of the index, the larger the shrinkage and the more inferior the tire uniformity.

(3) Increase in Mooney Viscosity

Mooney viscosity of unvulcanized rubber compositions obtained by mixing was measured after the same were left standing at a room temperature for 2 hours and 48 hours. The increase in Mooney viscosity was obtained by multiplying by 100 the ratio of the value obtained after 48 hours to the value obtained after 2 hours. The larger the value, the larger the increase in Mooney viscosity. A large increase in Mooney viscosity is disadvantageous. Mooney viscosity was measured in accordance with a method of Japanese Industrial Standard K6300 at 130° C. for 4 minutes after preheating for 1 minute.

(4) Uniformity of Tire

A tire inflated to a specific inner pressure was pressed to a drum under a specific load. The drum was rotated at such a speed that the tire made 60 revolutions per minute. The amounts of unbalance formed in the radial direction, in the axial direction and in the direction perpendicular to the axial direction of the tire were measured. The obtained result was expressed as an index using the result obtained in Comparative Example 1 as a reference set to 100. The smaller the numerical value of the index, the more superior the uniformity.

(5) Abrasion Resistance of Tire

Four test tires were placed on a 2000 cc passenger vehicle. After the vehicle was run about 30,000 km, the depth of a groove remaining on the tire was measured. The abrasion resistance was determined in accordance with the following formula: {(running distance (km) of test tire)/(depth (mm) of initial groove—depth (mm) of groove remaining on the tire after the running )}/{(running distance (km) of tire of Comparative Example 1)/(depth (mm) of initial groove—depth (mm) of groove remaining on the tire of Comparative Example 1 after the running)}. The obtained result is expressed as an index using the result obtained in Comparative Example 1 as a reference set to 100. The larger the numerical value of the index, the better the abrasion resistance.

The obtained results are shown in Tables 3 and 4.

TABLE 3

| Example | 1 | 2 | 3 | 4 | 5 |
|---|---|---|---|---|---|
| Formulation (parts by weight) | | | | | |
| polybutadiene rubber*1 | 10 | 10 | 10 | 10 | 10 |
| natural rubber | 25 | 25 | 25 | 25 | 25 |
| solution polymerized SBR | | | | | |
| type | I | II | I | II | I |
| amount | 65 | 65 | 65 | 65 | 65 |
| silica*2 | 40 | 40 | 40 | 40 | 40 |
| carbon black*3 | | | | | |
| type | X | X | X | X | X + Y |
| amount | 20 | 20 | 20 | 20 | 15 + 5 |
| silane coupling agent | | | | | |
| type | A | A | B | B | A |
| amount | 4 | 4 | 4 | 4 | 4 |
| aromatic oil | 2 | 2 | 2 | 2 | 2 |
| stearic acid | 2 | 2 | 2 | 2 | 2 |
| zinc oxide | 3 | 3 | 3 | 3 | 3 |
| N-oxydiethylene-2-benzothiazole-sulfenamide | 0.6 | 0.6 | 0.6 | 0.6 | 0.6 |
| di-2-benzothiazyl disulfide (DM) | 0.8 | 0.8 | 0.8 | 0.8 | 0.8 |
| N-isopropyl-N'-phenyl-p-phenylenediamine | 1 | 1 | 1 | 1 | 1 |
| sulfur | 1.5 | 1.5 | 1.5 | 1.5 | 1.5 |
| measured temperature of master batch immediately after mixing (° C.) | 166 | 168 | 166 | 170 | 168 |
| Evaluation | | | | | |
| shrinkage of unvulcanized rubber (index) | 112 | 109 | 110 | 108 | 106 |
| increase in Mooney viscosity | 107 | 108 | 108 | 112 | 106 |

TABLE 3-continued

| Example | 1 | 2 | 3 | 4 | 5 |
|---|---|---|---|---|---|
| uniformity (index) | 93 | 94 | 94 | 95 | 93 |
| abrasion resistance (index) | 98 | 102 | 99 | 105 | 100 |

TABLE 4

| Comparative Example | 1 | 2 | 3 | 4 |
|---|---|---|---|---|
| Formulation (parts by weight) | | | | |
| polybutadiene rubber*¹ | 10 | 10 | 10 | 10 |
| natural rubber | 25 | 25 | 25 | 25 |
| solution polymerized SBR | | | | |
| type | I | II | I | II |
| amount | 65 | 65 | 65 | 65 |
| silica*² | 40 | 40 | 40 | 40 |
| carbon black*³ | | | | |
| type | X | X | X | X |
| amount | 20 | 20 | 20 | 20 |
| silane coupling agent | | | | |
| type | C | C | D | D |
| amount | 4 | 4 | 4 | 4 |
| aromatic oil | 2 | 2 | 2 | 2 |
| stearic acid | 2 | 2 | 2 | 2 |
| zinc oxide | 3 | 3 | 3 | 3 |
| N-oxydiethylene-2-benzothiazole-sulfenamide | 0.6 | 0.6 | 0.6 | 0.6 |
| di-2-benzothiazyl disulfide (DM) | 0.8 | 0.8 | 0.8 | 0.8 |
| N-isopropyl-N'-phenyl-p-phenylenediamine | 1 | 1 | 1 | 1 |
| sulfur | 1.5 | 1.5 | 1.5 | 1.5 |
| measured temperature of master batch immediately after mixing (° C.) | 153 | 152 | 167 | 166 |
| Evaluation | | | | |
| shrinkage of unvulcanized rubber (index) | 100 | 98 | 114 | 111 |
| increase in Mooney viscosity | 118 | 121 | 101 | 101 |
| uniformity (index) | 100 | 102 | 93 | 91 |
| abrasion resistance (index) | 100 | 105 | 55 | 60 |

*¹BR01 (manufacture by JSR Co., Ltd.)
*²NIPSIL AQ (manufactured by NIPPON SILICA INDUSTRIAL Co., Ltd.) (N₂SA: 200 m²/g, DBP: 180 ml/100 g)
*³Carbon black X: N234 (manufactured by ASAHI CARBON Co., Ltd.) (N₂SA: 126 m²/g, DBP: 125 ml/100 g)
Carbon black Y: ketjen black EC (manufactured by KETJEN BLACK INTERNATIONAL Company)

As shown in Tables 3 and 4, in Comparative Examples 1 and 2, the uniformity of the pneumatic tires deteriorated because shrinkages of the unvulcanized rubber were large and the surfaces of the extruded rubber were not smooth. The increases in Mooney viscosity were large and workability in extrusion and calendering was inferior in Comparative Examples 1 and 2. In Comparative Examples 3 and 4, the reinforcing properties of silica markedly decreased to cause markedly inferior abrasion resistance of the tires although the shrinkages of the unvulcanized rubber were small and the uniformity of the tires was good. In contrast, the results obtained in the Examples were all excellent.

As described above, the rubber composition of the present invention shows excellent properties in that an increase in Mooney viscosity with time and shrinkage of the rubber composition obtained by mixing are suppressed, and workability is improved. The pneumatic tire obtained by using this rubber composition shows excellent uniformity and abrasion resistance.

What is claimed is:

1. A rubber composition which comprises:

a rubber component which is a blend rubber of a copolymer rubber and other diene based rubbers or the copolymer rubber alone, the copolymer rubber being obtained by copolymerization of 1,3-butadiene and styrene using an organolithium compound as an initiator, the copolymer rubber having a glass transition temperature of −60° C. or higher, a styrene content of 15 to 30% by weight and a vinyl content of 40 to 70% of a butadiene portion and the blend rubber comprising 55 parts by weight or more of the copolymer rubber and 45 parts by weight or less of the other diene based rubbers in 100 parts by weight of the rubber component;

20 to 100 parts by weight of silica per 100 parts by weight of the rubber component;

0 to 100 parts by weight of carbon black per 100 parts by weight of the rubber component, a ratio by weight of the amount of silica to the amount of carbon black being 1:1 to 1:0; and in an amount of 1 to 20% by weight of the amount of silica, a silane coupling agent represented by following general formula (1):

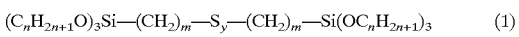

(wherein n represents an integer of 1 to 3, m represents an integer of 1 to 9, y represents a positive number of 1 or more and has a distribution), and in which the content of trisulfide silane component, where y is 3, is 25% or more based on the entire amount of the silane coupling agent, and the content of high polysulfide components, where y is 5 or a number greater than 5, is 50% or less based on the entire amount of the silane coupling agent.

2. A rubber composition according to claim 1, wherein the amount of said silane coupling agents is 2 to 15% by weight based on the amount by weight of silica.

3. A rubber composition according to claim 1, wherein the content of said trisulfide silane component, where y is 3, in the sulfide silane coupling agent molecule represented by general formula (1) is 30% or more based on the entire amount of the silane coupling agent, and the content of said high polysulfide silane components, where y represents 5 or a number greater than 5, is 40% or less based on the entire amount of the silane coupling agent.

4. A rubber composition according to claim 1, wherein said copolymer rubber has been treated by coupling at ends of the copolymer chains with one coupling agent selected from the group consisting of coupling agents containing tin, coupling agents containing silicon and coupling agents containing alkoxysilanes.

5. A rubber composition according to claim 1, wherein said other diene based rubber is at least one rubber selected from the group consisting of natural rubber, polybutadiene rubber, polyisoprene rubber and styrene-butadiene copolymer rubbers produced by emulsion polymerization.

6. A rubber composition according to claim 1, wherein said silica has colloidal properties which are a nitrogen adsorption specific surface area of 100 m²/g or more and less than 300 m²/g and a dibutyl phthalate oil absorption of 100 ml/100 g or more and less than 400 ml/100 g.

7. A rubber composition according to claim 1, wherein said rubber composition comprising said rubber component, said silica, said carbon black and said coupling agents is treated by mixing at temperatures having a maximum at 150° C. to 180° C.

8. A rubber composition according to claim 1, wherein said rubber composition shows an increase in Mooney viscosity of 2 to 15% after being left standing at a room temperature for 48 hours before being vulcanized.

9. A rubber composition according to claim 1, wherein said carbon black is an electrically conductive carbon black.

10. A pneumatic tire having a rubber composition disposed at least in a portion of a tread that is in contact with a road surface, wherein the rubber composition comprises:

a rubber component which is a blend rubber of a copolymer rubber and other diene based rubbers or the copolymer rubber alone, the copolymer rubber being obtained by copolymerization of 1,3-butadiene and styrene using an organolithium compound as an initiator, the copolymer rubber having a glass transition temperature of −60° C. or higher, a styrene content of 15 to 30% by weight and a vinyl content of 40 to 70% of a butadiene portion and the blend rubber comprising 55 parts by weight or more of the copolymer rubber and 45 parts by weight or less of the other diene based rubbers in 100 parts by weight of the rubber component;

20 to 100 parts by weight of silica per 100 parts by weight of the rubber component;

0 to 100 parts by weight of carbon black per 100 parts by weight of the rubber component, a ratio by weight of the amount of silica to the amount of carbon black being 1:1 to 1:0; and in an amount of 1 to 20% by weight of the amount of silica, a silane coupling agent represented by following general formula (1):

$$(C_nH_{2n+1}O)_3Si-(CH_2)_m-S_y-(CH_2)_m-Si(OC_nH_{2n+1})_3 \quad (1)$$

(wherein n represents an integer of 1 to 3, m represents an integer of 1 to 9, y represents a positive number of 1 or more and has a distribution), and in which the content of trisulfide silane component, where y is 3, is 25% or more based on the entire amount of the silane coupling agent, and the content of high polysulfide components, where y is 5 or a number greater than 5, is 50% or less based on the entire amount of the silane coupling agent.

11. A pneumatic tire according to claim 10, wherein the amount of said silane coupling agents is 2 to 15% by weight based on the amount by weight of silica.

12. A pneumatic tire according to claim 10, wherein the content of said trisulfide silane component, where y is 3, in the sulfide silane coupling agent molecule represented by general formula (1) is 30% or more based on the entire amount of the silane coupling agent, and the content of said high polysulfide silane components, where y represents 5 or a number greater than 5, is 40% or less based on the entire amount of the silane coupling agent.

13. A pneumatic tire according to claim 10, wherein said copolymer rubber has been treated by coupling at ends of the copolymer chains with one coupling agent selected from the group consisting of coupling agents containing tin, coupling agents containing silicon and coupling agents containing alkoxysilanes.

14. A pneumatic tire according to claim 10, wherein said other diene based rubber is at least one rubber selected from the group consisting of natural rubber, polybutadiene rubber, polyisoprene rubber and styrenebutadiene copolymer rubbers produced by emulsion polymerization.

15. A pneumatic tire according to claim 10, wherein said silica has colloidal properties which are a nitrogen adsorption specific surface area of 100 m$^2$/g or more and less than 300 m$^2$/g and a dibutyl phthalate oil absorption of 100 ml/100 g or more and less than 400 ml/100 g.

16. A pneumatic tire according to claim 10, wherein said rubber composition comprising said rubber component, said silica, said carbon black and said coupling agents is treated by mixing at temperatures having a maximum at 150° C. to 180° C.

17. A pneumatic tire according to claim 10, wherein said rubber composition shows an increase in Mooney viscosity of 2 to 15% after being left standing at a room temperature for 48 hours before being vulcanized.

18. A pneumatic tire according to claim 10, wherein said carbon black is an electrically conductive carbon black.

* * * * *